United States Patent [19]

Liman et al.

[11] Patent Number: 6,078,327
[45] Date of Patent: Jun. 20, 2000

[54] NAVIGATING APPLICATIONS AND OBJECTS IN A GRAPHICAL USER INTERFACE

[75] Inventors: Erin A. Liman, Palo Alto; Darryl J. Mocek, San Jose; Donald J. Pilcher, Half Moon Bay; Gregory Rakoshitz, Palo Alto; Martin T. Robins, Sunnyvale, all of Calif.

[73] Assignee: International Business Machines Corporation, Armonk, N.Y.

[21] Appl. No.: 08/927,793

[22] Filed: Sep. 11, 1997

[51] Int. Cl.[7] .................................................. G06F 3/14
[52] U.S. Cl. ............................................................ 345/357
[58] Field of Search .................................. 345/356, 357, 345/340, 352, 353, 326, 146

[56] References Cited

U.S. PATENT DOCUMENTS

| | | |
|---|---|---|
| 4,821,211 | 4/1989 | Torres ...................................... 345/357 |
| 5,491,795 | 2/1996 | Beaudet et al. ...................... 345/357 X |
| 5,621,905 | 4/1997 | Jewson et al. .......................... 345/353 |
| 5,644,736 | 7/1997 | Healy et al. ........................ 345/357 X |
| 5,701,137 | 12/1997 | Kiernan et al. .......................... 345/340 |
| 5,815,154 | 9/1998 | Hirschtick et al. ..................... 345/356 |
| 5,838,319 | 11/1998 | Guzak et al. ............................ 345/340 |
| 5,917,492 | 6/1999 | Bereiter et al. .......................... 345/357 |
| 5,923,328 | 7/1999 | Griesmer ................................. 345/357 |

Primary Examiner—Crescelle N. dela Torre
Attorney, Agent, or Firm—Kudirka & Jobse, LLP

[57] ABSTRACT

A Navigator window is displayed in conjunction with an application program window on a monitor attached to a computer, wherein the Navigator window comprises a collapse-expand tree control for traversing one or more applications created by the application program, each of the applications is comprised of one or more objects, and the application program window displays an application or object selected in the Navigator window.

12 Claims, 8 Drawing Sheets

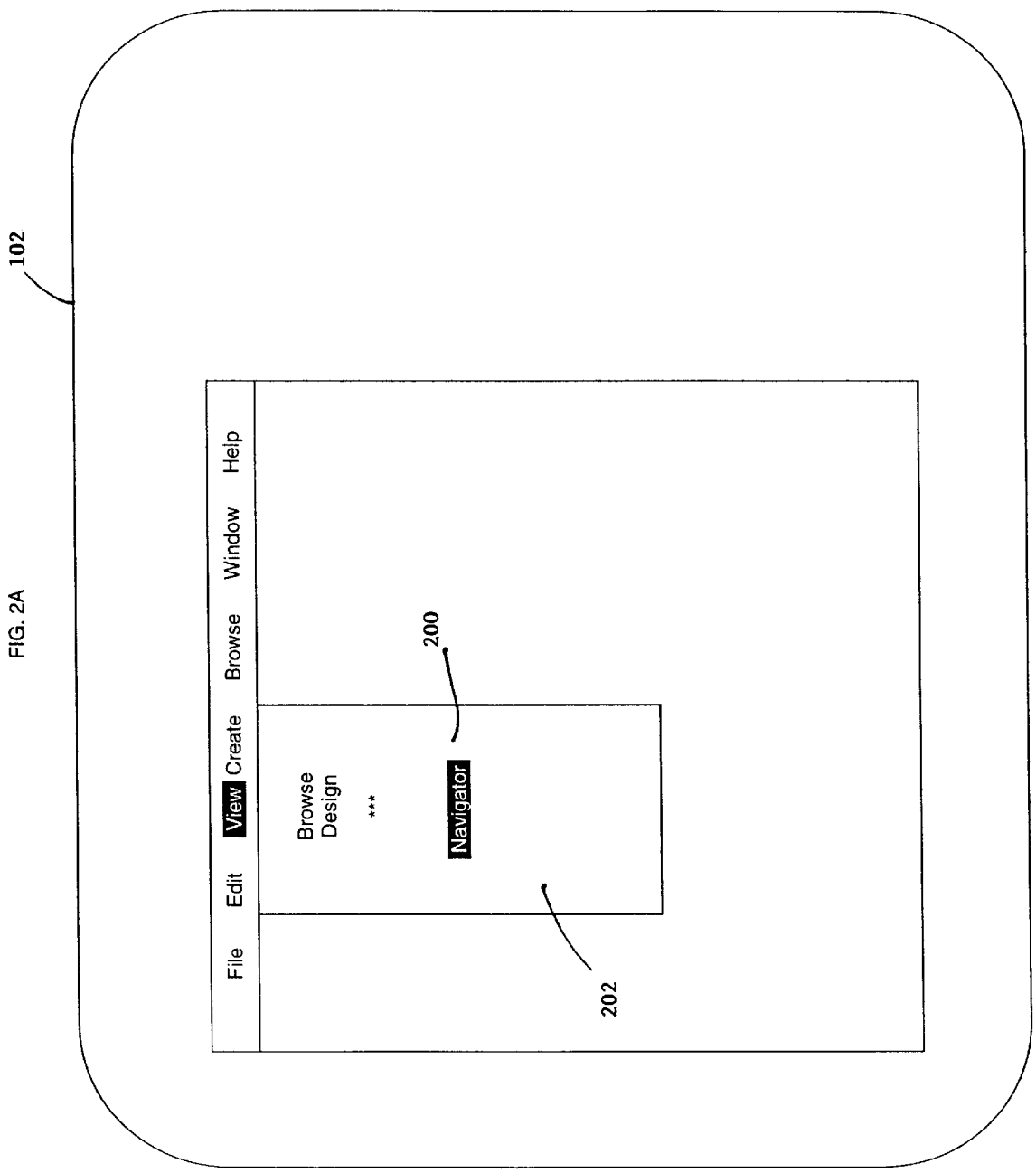

NAVIGATING APPLICATIONS AND OBJECTS IN A GRAPHICAL USER INTERFACE

BACKGROUND OF THE INVENTION

1. Field of the Invention

The present invention relates generally to graphical user interfaces, and in particular, to a method, apparatus, and article of manufacture for navigating applications and objects in a graphical user interface.

2. Description of the Related Art

Graphical user interfaces (GUIs) have greatly enhanced the usability and productivity of computer software. In most GUIs, such as found in operating systems such as Microsoft Windows (3.x, 95, and NT), IBM OS/2, Apple Macintosh, and some versions of the UNIX operating system, data is supplied to a user through one or more windows or views.

Two well known utility for use with the GUI is the File Manager for Windows 3.x and the Explorer for Windows 95. These utilities allow users to display the contents of disk drives, directories, sub-directories, and files. Once activated, the File Manager or Explorer displays a directory window divided into two parts, wherein a left portion of the window displays a directory tree with an expand-collapse tree structure of disk drives, directories and subdirectories and a right portion of the window displays the contents of a selected disk drive, directory, or subdirectory. Plus (+) signs and minus (−) signs shown in the directory tree designate expandable and collapsible branches thereof. For example, a plus (+) sign in a directory or subdirectory icon indicates that additional subdirectories are located within the icon, whereas a minus (−) sign in a subdirectory icon indicates that the directory can be collapsed inside its parent directory. A folder icon without a plus (+) or minus (−) sign indicates that it is the lowest level of subdirectory.

In this manner, both the File Manager and Explorer allow a user to display and traverse the hierarchical structure of data storage devices. However, these utilities can only be used with the data storage devices and the file system provided by the computer. Consequently, a significant need exists for a utility that allows a user to display and traverse the hierarchical structure of applications or documents and the elements or components thereof to facilitate the access, display and processing of the applications and objects.

SUMMARY OF THE INVENTION

To address the requirements described above, the present invention discloses a method, apparatus, and article of manufacture for displaying a Navigator window is displayed in conjunction with an application program window on a monitor attached to a computer, wherein the Navigator window comprises a collapse-expand tree control for traversing one or more applications created by the application program, each of the applications is comprised of one or more objects, and the application program window displays an application or object selected in the Navigator window.

BRIEF DESCRIPTION OF THE DRAWINGS

Referring now to the drawings in which like reference numbers represent corresponding parts throughout:

FIGS. 2A–2D illustrate a graphical user interface (GUI) displayed on a monitor according to the present invention;

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Hardware Environment

Figure 1:
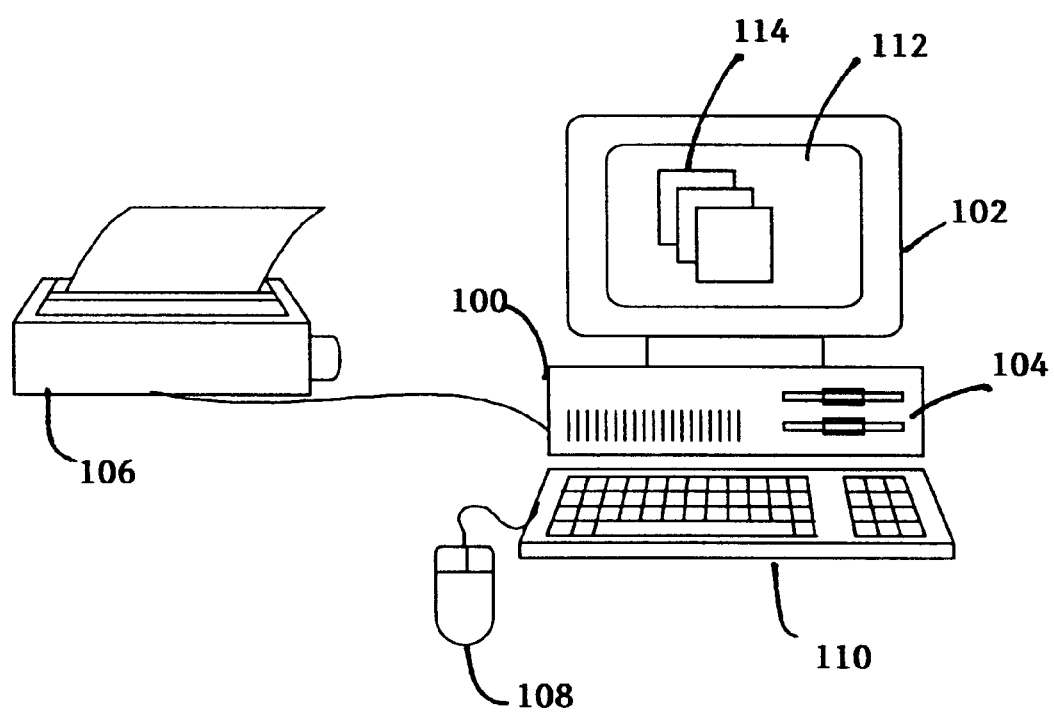
FIG. 1 is an exemplary hardware environment used to implement the preferred embodiment of the invention.

FIG. 1 is an exemplary hardware environment used to implement the preferred embodiment of the invention. The present invention is typically implemented using a personal computer 100, which generally includes, inter alia, a processor, random access memory (RAM), read only memory (ROM), a video card, bus interface, and/or other components. It is envisioned that attached to the personal computer 100 may be a monitor 102 (e.g., a CRT, an LCD display, or other display device), data storage devices 104 such as hard, floppy, and/or CD-ROM disk drives, and printer 106 peripherals. Also included in the preferred embodiment may be input devices, for example, a mouse pointing device 108 and a keyboard 110. Those skilled in the art will recognize that any combination of the above components, or any number of different components, peripherals, and other devices, may be used with the computer 100.

The personal computer 100 operates under the control of an operating system 112, which is represented in FIG. 1 by the screen displayed on the monitor 102. The present invention is usually implemented in one or more computer programs 114 that operate under the control of the operating system 112, which programs 114 are represented in FIG. 1 by the windows displayed within the screen on the monitor 102. However, it should be understood that, in the alternative, the principles of the invention may also apply to specific utilities or functions within the operating system 112 itself. In general, the functions performed in the present invention, whether implemented as part of an operating system or a specific application, will be referred to herein as "computer programs".

Generally, the computer programs which implement the preferred embodiment of the invention are embodied in or readable from a computer-readable device, medium, or carrier, e.g., one or more of the fixed and/or removable data storage devices 104 and/or data communications devices connected to the computer 100. Under control of operating system 112, the computer programs 114 may be retrieved from the data storage devices or data communications devices into the memory of computer 100. The computer programs comprise instructions which, when read and executed by computer 100, cause the computer 100 to perform the steps necessary to execute the steps or elements of the present invention.

Those skilled in the art will recognize that the exemplary environment illustrated in FIG. 1 is not intended to limit the present invention. Indeed, those skilled in the art will recognize that other alternative hardware environments may be used without departing from the scope of the present invention.

Navigator

The present invention is a Navigator utility or computer program that comprises a dockable window (miniframe window) that presents a collapse-expand tree control for traversing objects or elements within an application. In the preferred embodiment, a hierarchy of applications and objects are displayed in the dockable window, wherein various levels of the hierarchy may be displayed or hidden as desired and each level of the hierarchy is a different element of that level. The Navigator window allows a user to easily view the contents of all open or selected applications or objects and to navigate quickly to any application or object presented on the tree control.

Applications and objects within the context of the invention may include any arrangement of related information generated or executed by a specified application program that are suitable for display within the dockable window. In the preferred embodiment, individual objects may represent particular components of a selected application. However, it should be appreciated that an application or object may contain any arrangement of information suitable for display to a user by the computer 100. For example, applications may comprise documents and objects may comprise user-editable elements within the documents.

Standard GUI mechanisms are preferably implemented to permit the display characteristics of the Navigator window to be modified in much the same manner as any window. It should be appreciated that these functions are standard in many GUI environments, and well understood by those of ordinary skill in the art. Implementation of these mechanisms is well known in art, and include such functions as minimizing, maximizing, closing, opening, resizing, repositioning, etc., the Navigator window.

The Navigator is invoked by the user selecting a View/Show Navigator function 200 from a View menu 202 as shown in FIG. 2A. In the example of FIG. 2A, the Navigator is invoked within the APPROACH® application program sold by Lotus Development Corporation, a wholly-owned subsidiary of IBM Corporation, the assignee of the present invention. The APPROACH® application program is a database management system (DBMS) often purchased as part of the LOTUS® SMARTSUITE® office productivity package. The Navigator thus allows a user to traverse the applications and objects created or executed by the APPROACH® application program. Of course, those skilled in the art will recognize that the Navigator could be used with other products as well.

Figure 2B:
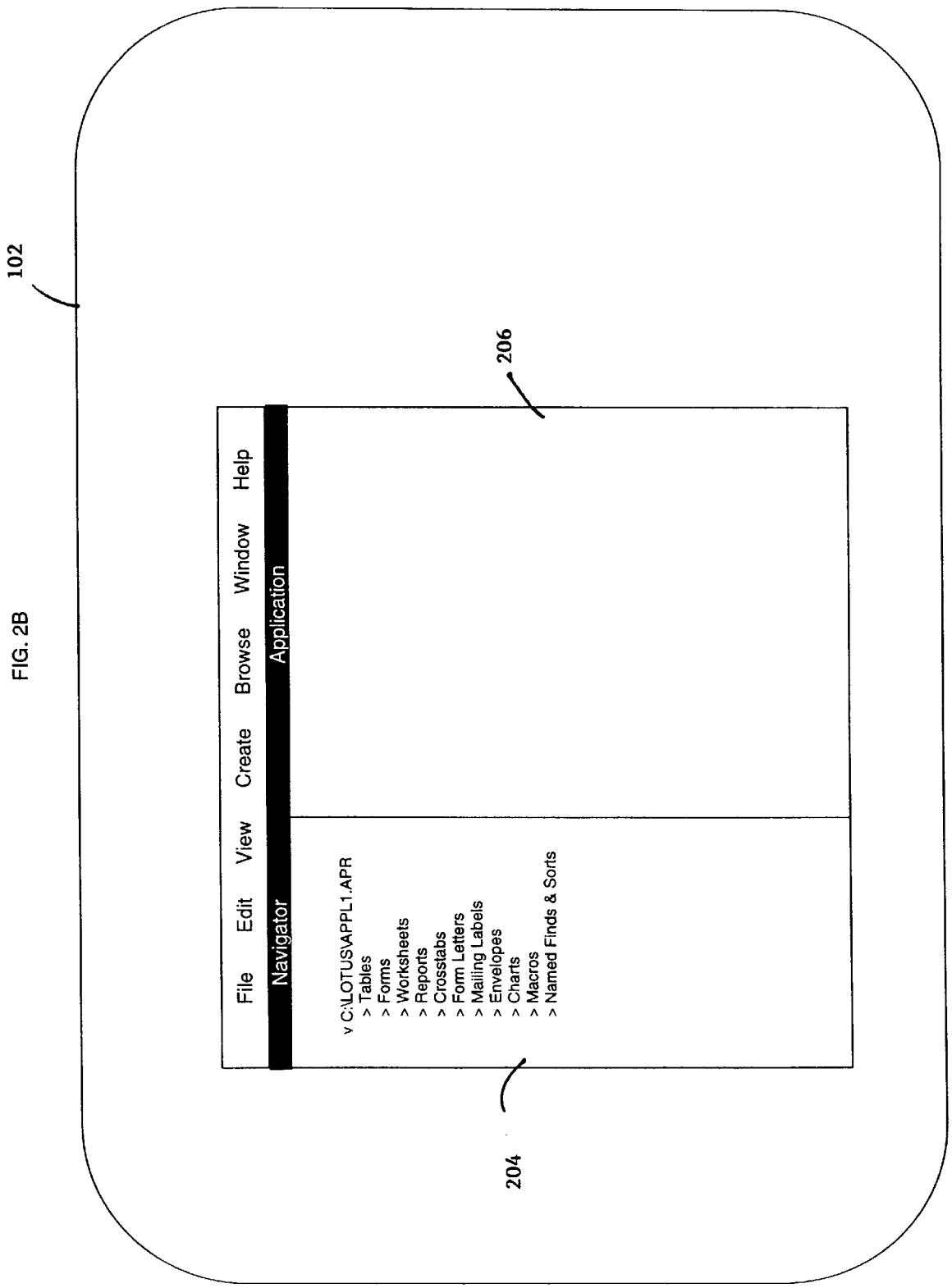

When first created, the Navigator window 204 docks to the left side of the application program window 206 as shown in FIG. 2B. When docked, the Navigator window 204 may be dragged left-right to desired width. The initial height of the window 204 will be the distance between the menu bar and the bottom of the application program window 206.

The Navigator window 204 may be torn away to float or to dock elsewhere in the application program window 206. When floating, the Navigator window 204 includes a dialog close box in the upper right corner. Also when floating, the Navigator window 204 may be re-sized vertically and not just horizontally.

The Navigator window 204 displays one or more applications, as well as one or more objects within the application, in a specified order. In the example of FIG. 2B using the APPROACH® application program, the application is identified and labeled as "c:\lotus\appl1.apr", wherein the ".apr" is an extension that identifies an APPROACH® application. Contained within this application are a number of object types are grouped into sections labeled as Tables, Forms, Worksheets, Crosstabs, Mailing Labels, Form Letters, Reports, Charts, Envelopes, Named Finds & Sorts, and Macros.

In the preferred embodiment, each section is shown regardless of whether it contains any members. In an alternative embodiment, only those sections that contain members may be shown. This aspect of the display of information could be controlled by a user-definable preference.

A SingleClick on the triangle icon next to a label expands to the next level of the tree control or collapses the selected section. Thus, the triangle icon next to the label expands to the next level of the tree control or collapses the selected level. In the example of FIG. 2B, the triangle icon next to the application label has been selected to expand (as indicated by the downward-pointing triangle icon) to the next level of the tree control comprising the object types, which are collapsed in this view (as indicated by the rightward-pointing triangle icon).

Both the triangle icon and the label appear "grayed out" and are unselectable when the level contains no entries, and thus cannot be expanded. This gives the user an idea of the many levels are available for viewing using the Navigator window 204.

Figure 2C:
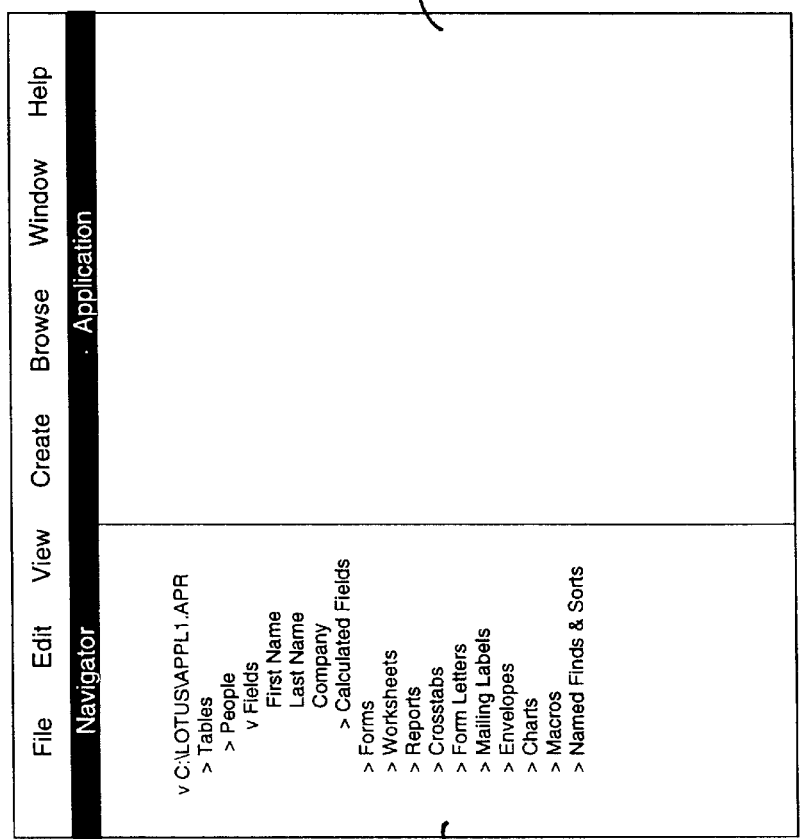
Figure 2D:
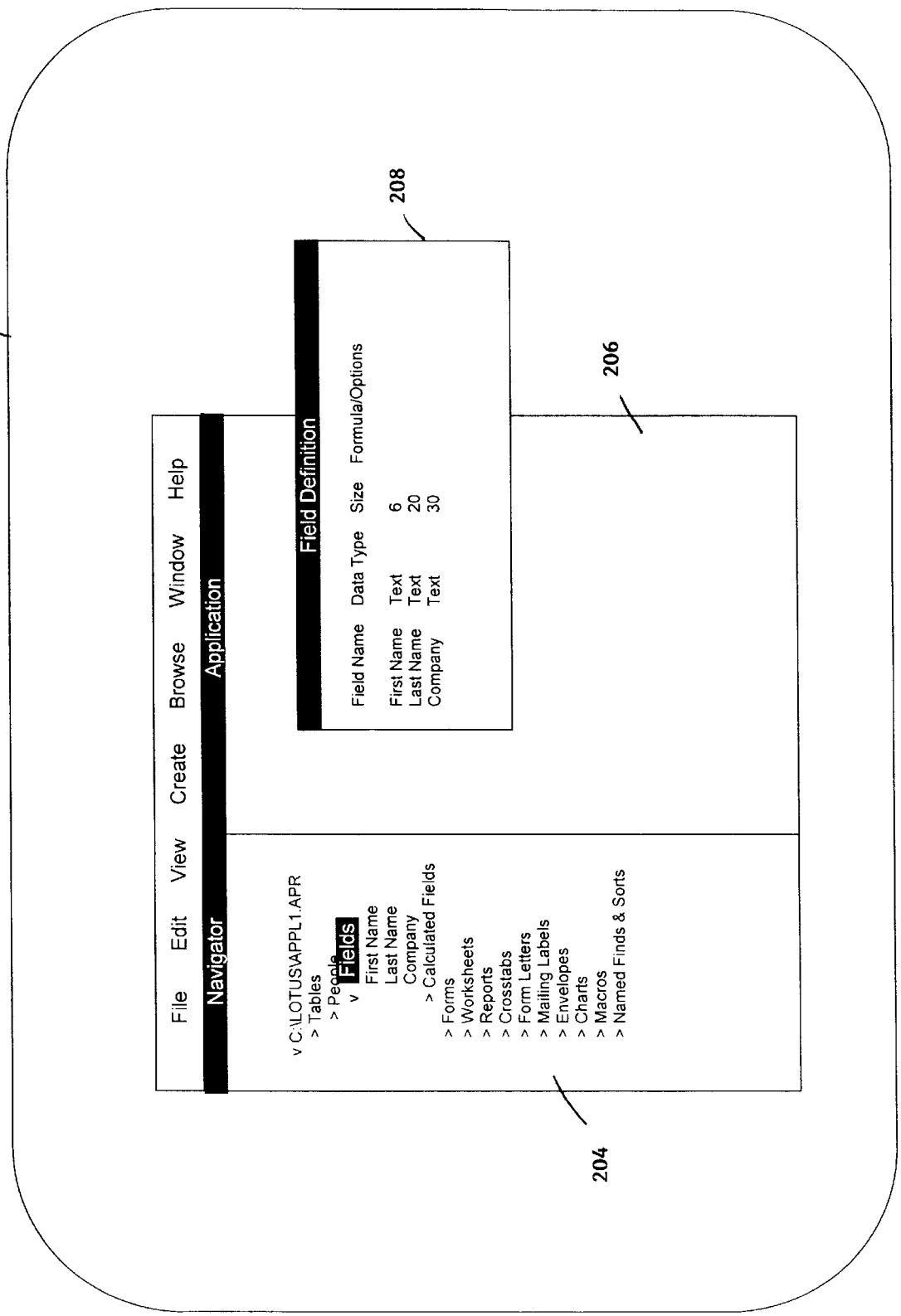

Other examples of the Navigator window 204 include FIGS. 2C and 2D, wherein FIG. 2C illustrates an expanded Tables section and FIG. 2D illustrates a Field definition dialog box 208 for editing purposes, etc., that is displayed when a field is selected within the expanded Table section.

Flowcharts

Figure 3:
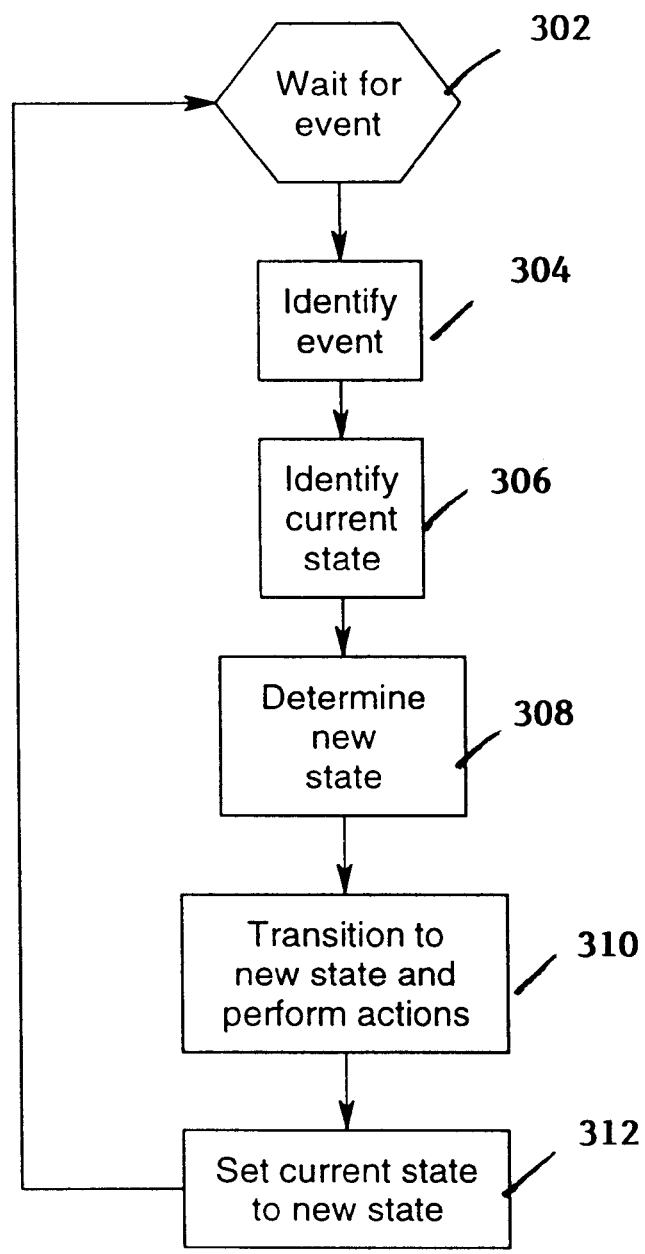
FIG. 3 is a flowchart that illustrates the general logic of a message or event-driven operating system performing the steps of the present invention.

FIG. 3 is a flowchart that illustrates the general logic of a message or event-driven operating system 112 performing the steps of the present invention. In such a system 112, operations are performed when transitions are made, based upon the receipt of messages or events, from present or current states to new states.

Generally, routine 300 begins by waiting at block 302 for an event (e.g., a mouse button click). It should be appreciated that during this time, other operating system 112 tasks, e.g., file, memory, and video tasks, etc., may also be carried out. When an event occurs, control passes to block 304 to identify the event. Based upon the event, as well as the current state of the system 112 determined in block 306, a new state is determined in block 308. In block 310, the routine 300 transitions to the new state and performs any actions required for the transition. In block 312, the current state is set to the previously determined new state, and control returns to block 302 to wait for more input events.

The specific operations that are performed by block 310 when transitioning between states will vary depending upon the current state and the event. The various operations required to implement and maintain the Navigator of the present invention represent particular events handled by routine 300. However, it should be appreciated that these operations represent merely a subset of all of the events handled by any operating system 112.

Figure 4:
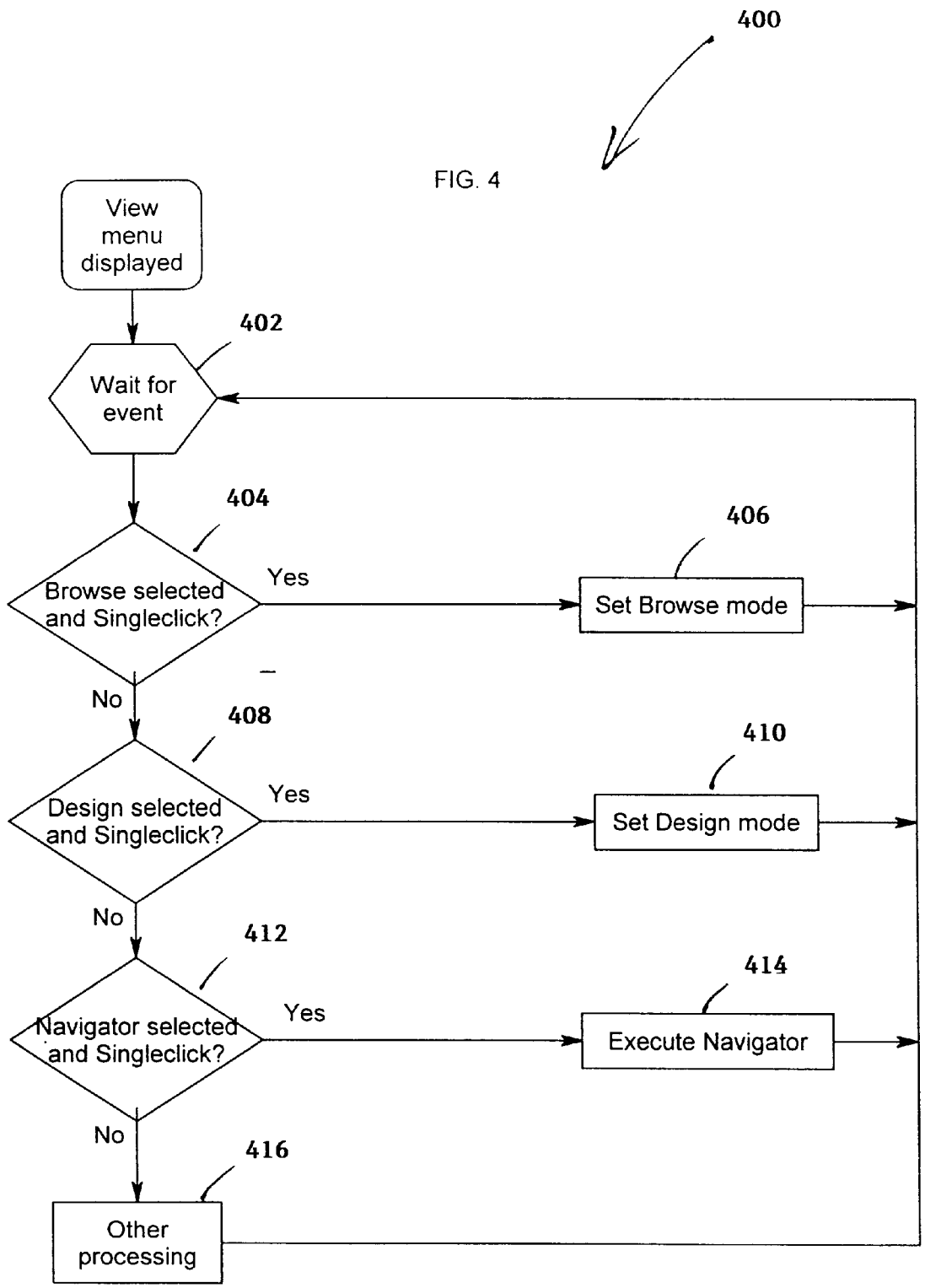
FIG. 4 is a flowchart that illustrates the general logic for a routine that is performed when a View menu is displayed.
Figure 5:
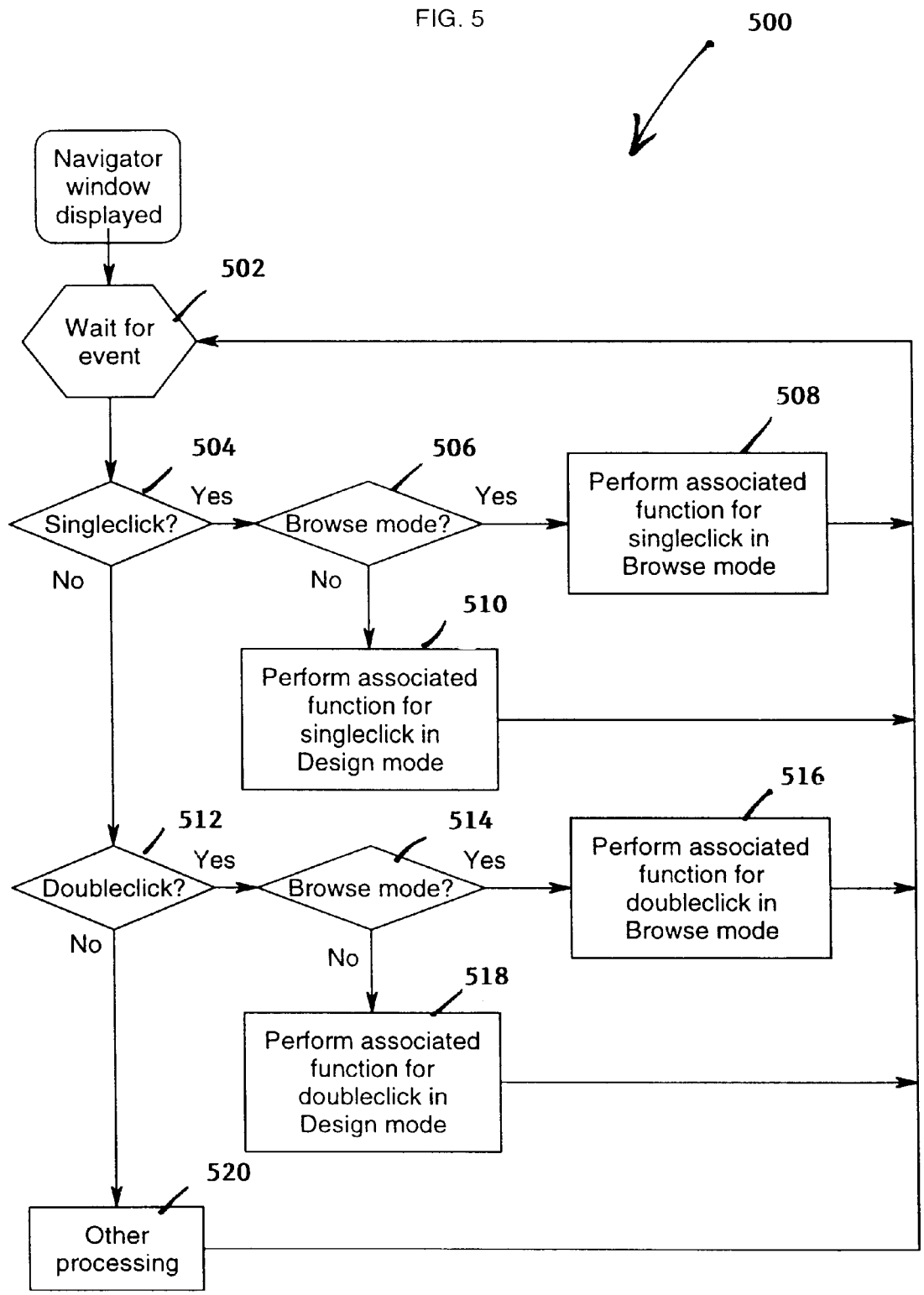
FIG. 5 is a flowchart that illustrates the general logic routine for functions performed by the Navigator.

Flowcharts which illustrate various operations that may be performed using the Navigator of the present invention are shown in FIGS. 4 and 5.

FIG. 4 is a flowchart that illustrates the general logic for a routine 400 that is performed when a View menu is displayed. Generally, routine 400 begins by waiting at block 402 for an event (e.g., a mouse button click signifying selection of a menu item). When an event occurs, control passes to blocks 404–416 to identify the events and perform associated functions. For example, Block 404 represents the computer 100 determining that the Browse mode was selected from the view menu and Block 406 represents the computer 100 indicating that Browse mode has been set in response thereto; Block 408 represents the computer 100 determining that the Design mode was selected from the view menu and Block 410 represents the computer 100 indicating that Design mode has been set in response thereto; and Block 412 represents the computer 100 determining that the Show Navigator function was selected from the view menu and Block 414 represents the computer 100 executing the Navigator function in response thereto. Block 416 represents the computer 100 performing other processing.

FIG. 5 is a flowchart that illustrates the general logic routine 500 for functions performed by the Navigator. Generally, routine 500 begins by waiting at block 502 for an event (e.g., a mouse button click signifying selection of a function). When an event occurs, control passes to blocks 504–520 to identify the events and perform associated functions. Block 504 is a decision block that represents the computer 100 determining that a SingleClick of any button of the mouse occurred. If so, control transfers to Block 506; otherwise, control transfers to Block 512. Block 506 is a decision block that represents the computer 100 determining whether the Navigator is in Browse mode. If so, control transfers to block 508, which represents the computer 100 performing the associated function for the SingleClick event in Browse mode; otherwise, control transfers to block 510, which represents the computer 100 performing the associated function for the SingleClick event in Design mode. Block 512 is a decision block that represents the computer 100 determining that a DoubleClick of any button of the mouse occurred. If so, control transfers to Block 514; otherwise, control transfers to Block 520. Block 514 is a decision block that represents the computer 100 determining whether the Navigator is in Browse mode. If so, control transfers to Block 516, which represents the computer 100 performing the associated function for the DoubleClick event in Browse mode; otherwise, Block 518 represents the computer 100 performing the associated function for the DoubleClick event in Design mode. Block 520 represents the computer 100 performing other processing.

The various functions associated with SingleClick and DoubleClick events are determined by the current state of the Navigator. In many instances, the current state is represented visually on the monitor 102 by a selected item.

Because of the large number of states and events that are associated with the Navigator, various operations performed by the Navigator are described in more detail below. Generally, these various operations performed by the Navigator can be classified within certain categories:

while in any mode, expanding and collapsing levels within the Navigator window;

while in Browse mode, selecting an application or object in the Navigator window to display or execute the application or object in the application program window; or while in Design mode, selecting an application or object in the Navigator window to modify or edit the application or object in the application program window.

In the preferred embodiment, the various operations described below are specifically related to the APPROACH® application program. Of course, those skilled in the art will recognize that the use of the Navigator with different application programs may result in the different operations (or potentially the same operations).

Also in the preferred embodiment, the identifiers Single-Click and DoubleClick are intended to indicate a default single or double click action, which uses the left mouse button. Other mouse buttons are indicated through the use of appended identifiers, such as (RightMouseButton), etc.

Of course, those skilled in the art will recognize that the use of any mouse button, keyboard sequence, voice command, or other user input is merely a design choice, and the functions performed by the Navigator could be invoked by any number of different combinations of mouse buttons, keyboard sequences, voice command, or any other user input.

Tables

In Browse mode, a SingleClick on the triangle icon of the Tables section expands the section, revealing all Tables in the current application. If the user does not have Design privileges, then the Tables section is grayed and cannot be expanded in Browse.

A SingleClick on the triangle icon of a displayed Table expands the section, revealing additional section headings for Fields and Calculated Fields. When a specific Table is expanded, only the Fields sub-section is automatically expanded in the Navigator window.

The Fields sub-section of the Tables section includes only "true" data Fields, not calculated fields. If the user is in Design mode, a DoubleClick of a Table name (when in Browse or Design modes) brings up the Field Definition dialog with the selected table in focus.

A SingleClick on the triangle icon of the Calculated Fields section expands the section, revealing all calculated fields, presented in lowercase italics.

A DoubleClick on a Field Name within a Table Name brings up the Field Definition dialog for the specific table, with the selected field in focus.

Field

A SingleClick (RightMouseButton) on a Field name provides support for Cut, Copy, Paste, Rename, etc. using this function. As stated above, a DoubleClick on a Field brings up a Field Definition dialog with the current Field and Table in focus.

Forms

In Browse mode, a SingleClick on the triangle icon of the Forms section expands the section, revealing Forms which are not designated as Hidden, Forms as Dialogs, and Forms for which the user as security authorization.

In Design mode, a SingleClick on the triangle icon of the Forms section expands the section, revealing all forms.

A SingleClick on the triangle icon of a displayed Form expands the section, revealing sub-sections for Fields, Buttons, Graphics, Text Blocks, and Other. When a specific Form is expanded, only the Fields sub-section is automatically expanded in the Navigator window.

In Design mode, the Other section is used to display Groups of objects, OLE controls, and Repeating Panels (sub-frames). A DoubleClick on an item in the Other section gives it focus in the application program window and brings up the InfoBox. The Other section will also be used to display objects which have not yet been assigned to existing sections.

In both Browse and Design modes, an additional sub-section level is added to the Navigator window for each Page of a multi-page Form. There is no Page section on single-page Forms.

In Browse mode, a DoubleClick of a Form name puts the selected Form into the application program window.

In Design mode, a DoubleClick of a Form name puts the selected Form into the application program window and brings up the InfoBox for the selected Form. A DoubleClick of a Field name on the expanded section under a Form name brings up the InfoBox with the selected Field in focus.

Worksheet

In Browse mode, a SingleClick on the triangle icon of the Worksheets section expands the section, revealing Worksheets which are not hidden and which the user is entitled to see.

In Design mode, a SingleClick on the triangle icon of the Worksheets section expands the section, revealing all Worksheets.

In Browse mode, a DoubleClick of a specific Worksheet name displays the selected Worksheet in the application program window.

A SingleClick on the triangle icon of a displayed Worksheet expands the section, revealing sub-sections for Fields and Graphics. Only the Fields sub-section is automatically expanded in the Navigator window.

In Browse or Design mode, a DoubleClick on a Field name displayed under an expanded Worksheet name selects the entire column on the Worksheet and brings up the InfoBox for the Field.

Reports

In Browse mode, a SingleClick on the triangle icon of the Reports section expands the section, revealing Reports which are not hidden and which the user is entitled to see.

In Design mode, a SingleClick on the triangle icon of the Reports section expands the section, revealing all Reports which the user is entitled to see.

In Browse or Design mode, a DoubleClick of a Report name displays the selected Report in the application program window.

A SingleClick on the triangle icon of a displayed Report expands the section, revealing sub-sections for Fields, Buttons, Graphics, Text Blocks, and Other. When a specific Report is expanded, only the Fields sub-section is automatically expanded in the Navigator window.

In Design mode, the Other section is used to display Groups of objects, OLE controls, and Charts. A DoubleClick on an item in the Other section gives it focus in the application program window and brings up the InfoBox. The Other section will also be used to display objects which have not yet been assigned to existing sections.

In Browse mode, a DoubleClick on a Field name displayed under an expanded Report name selects the Field on the Report, which is opened in the application program window.

In Design mode, a DoubleClick on a Field name displayed under an expanded Report name selects the Field on the Report, which is opened in the application program window and brings up the InfoBox for the selected Field. The Navigator window also displays Headers, Footers, and Summaries.

Crosstabs

In Browse mode, a SingleClick on the triangle icon of the Crosstabs section expands the section, revealing Crosstabs which are not hidden and which the user is entitled to see.

In Design mode, a SingleClick on the triangle icon of the Crosstabs section expands the section, revealing all Crosstabs.

In Browse mode, a DoubleClick on a specific Crosstab name displays the selected Crosstab in the application program window.

In Browse or Design mode, a SingleClick on the triangle icon of a displayed Crosstab expands the section, revealing a sub-section for Fields. The Fields sub-section is automatically expanded in the Navigator window, revealing Fields and Calculated Fields (which display in lowercase italics)

In Browse or Design mode, a DoubleClick on a Field name displayed under an expanded Crosstab name selects the entire column or row on the Crosstab and brings up the InfoBox for the Field.

Charts

In Browse mode, a SingleClick on the triangle icon of the Charts section expands the section, revealing Charts which are not hidden and which the user is entitled to see.

In Design mode, a SingleClick on the triangle icon of the Charts section expands the section, revealing all Charts.

In Design mode, a DoubleClick of a Chart name displays the selected Chart in the application program window and brings up the InfoBox for the Chart.

A SingleClick on the triangle icon of a displayed Chart expands the section, revealing the word "Chart".

Mailing Labels

In Browse mode, a SingleClick on the triangle icon of the Mailing Labels section expands the section, revealing Mailing Labels which are not hidden and which the user is entitled to see.

In Design mode, a SingleClick on the triangle icon of the Mailing Labels section expands the section, revealing all Mailing Labels.

In Browse mode, a DoubleClick of a specific Mailing Label name displays the selected Mailing Label view in the application program window.

A SingleClick on the triangle icon of a displayed Mailing Label expands the section, revealing sub-sections for Fields, Buttons, Graphics, Text Blocks, and Other.

In Design mode, a DoubleClick of a Mailing Label puts the selected Mailing Label into the application program window and brings up the InfoBox for the selected Mailing Label. A DoubleClick of a Field Name or other element on the expanded section under a Mailing Label brings up the InfoBox with the selected element in focus.

Form Letters

In Browse mode, a SingleClick on the triangle icon of the Form Letters section expands the section, revealing Form Letters which are not hidden and which the user is entitled to see.

In Design mode, a SingleClick on the triangle icon of the Form Letters section expands the section, revealing all Form Letters.

In Browse mode, a DoubleClick of a Form Letter name displays the selected Form Letters view in the application program window.

A SingleClick on the triangle icon of a displayed Form Letter expands the section, revealing the text "Form Letter".

In Design mode, a DoubleClick of a Form Letter puts the selected Form Letter into the application program window and brings up the InfoBox for the selected Form Letter.

Envelopes

In Browse mode, a SingleClick on the triangle icon of the Envelopes section expands the section, revealing Envelopes which are not hidden and which the user is entitled to see.

In Design mode, a SingleClick on the triangle icon of the Envelopes section expands the section, revealing all Envelopes.

In Browse mode, a DoubleClick of an Envelope name displays the selected Envelope view in the application program window.

A SingleClick on the triangle icon of a displayed Envelope expands the section revealing sub-sections for Fields, Buttons, Graphics, Text Blocks, and Other.

In Browse mode, a DoubleClick of an Envelope puts the selected Envelope into the application program window.

In Design mode, a DoubleClick of an Envelope puts the selected Envelope into the main window and brings up the InfoBox for the selected Envelope. A DoubleClick of a Field Name or other element on the expanded section under an Envelope brings up the InfoBox with the selected element in focus.

Macros

In Browse mode, a SingleClick on the triangle icon of the Macros section expands the section, revealing Macros which are allowed to be presented in the Macros menu selection, e.g., those for which the Show in Menu checkbox is selected in the Macro dialog.

In Design mode, a SingleClick on the triangle icon of the Macro section expands the section, revealing all Macros.

In Browse mode, a DoubleClick on a displayed Macro executes the macro.

In Design mode, a DoubleClick of a Macro brings up the Define Macro dialog in the application program window, with the selected Macro in focus.

Named Finds and Sorts

In Browse mode, a SingleClick on the triangle icon of the Named Finds and Sorts section expands the section, revealing all Named Finds and Sorts.

In Browse mode, a DoubleClick on a displayed Named Find/Sort executes the Named Find/Sort.

In Design mode, a SingleClick on the triangle icon of the Named Finds and Sorts section expands the section, revealing all Named Finds and Sorts. They are grayed out, since they cannot be defined or executed in Design mode.

Conclusion

This concludes the description of the preferred embodiment of the invention. The following describes some alternative embodiments for accomplishing the present invention.

For example, any type of computer, such as a mainframe, minicomputer, work station or personal computer, could be used with the present invention. In addition, any software program, application or operating system having a graphical user interface could benefit from the present invention.

Those skilled in the art will recognize that additional functions may also be implemented using the Navigator. Specifically, the Navigator should be integrated closely with each application program and allow the user to invoke the various operations of the application from the Navigator.

In summary, the present invention discloses a method, apparatus, and program storage device for displaying a Navigator window in conjunction with an application program window on a monitor attached to a computer, wherein the Navigator window comprises a collapse-expand tree control for traversing one or more applications created by the application program, each of the applications is comprised of one or more objects, and the application program window displays an application or object selected in the Navigator window.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of displaying information comprising the steps of:

displaying a Navigator window in conjunction with an application program window on the monitor, the Navigator window displaying a hierarchy of applications or objects and a selectable collapse-expand tree control for traversing one or more applications created by the application program, each of the applications comprising one or more objects, the objects displayed in the hierarchy being grouped according to one or more object types selected from a group comprising Tables, Forms, Worksheets, Crosstabs, Mailing Labels, Form Letters, Reports, Charts, Envelopes, Named Finds & Sorts, and Macros; and displaying in the application program window one of the application, object or element selected in the Navigator window.

2. The method of claim 1, further comprising the step of:

modifying a display characteristic of the Navigator window, the display characteristic selected from a group comprising maximizing the Navigator window, minimizing the Navigator window, resizing the Navigator window, closing the Navigator window, opening the Navigator window, repositioning the Navigator window, and combinations thereof.

3. The method of claim 1, wherein various levels of the hierarchy may be displayed or hidden as desired, thereby allowing a user to easily view the contents of all open or selected applications or objects and to navigate quickly to any application or object presented on the tree control.

4. The method of claim 3, wherein the object types are identified by a label and the method further comprises the step of:

selecting an icon next to the label to navigate to a next level of the tree control.

5. In a computer system having a monitor attached thereto, an apparatus for displaying information, comprising:

means for displaying a Navigator window in conjunction with an application window on the monitor, the Navigator window displaying a hierarchy of applications or objects and a selectable collapse-expand tree control for traversing one or more applications, each of the applications comprises one or more objects, the objects displayed in the hierarchy being grouped according to one or more object types selected from a group comprising Tables, Forms, Worksheets, Crosstabs, Mailing Labels, Form Letters, Reports, Charts, Envelopes, Named Finds & Sorts, and Macros, and;

means for displaying in the application window one of the applications, element or object selected in the Navigator window.

6. The apparatus of claim 5, further comprising:

means for modifying a display characteristic of the Navigator window, the display characteristic selected from a group comprising maximizing the Navigator window, minimizing the Navigator window, resizing the Navigator window, closing the Navigator window, opening the Navigator window, repositioning the Navigator window, and combinations thereof.

7. The apparatus of claim 5 wherein various levels of the hierarchy may be displayed or hidden as desired, thereby allowing a user to easily view the contents of all open or selected applications or objects and to navigate quickly to any application or object presented on the tree control.

8. The apparatus of claim 7, wherein the object types are identified by a label and the apparatus further comprises:

to enable selection of an icon next to the label to navigate to a next level of the tree control.

9. A computer program product for use with a computer system having a monitor coupled thereto, the computer program product comprising a computer usable medium having program code stored thereon comprising:

program code configured to display a navigator window in conjunction with an application window on the monitor, the navigator window displaying a hierarchy of applications or objects and a selectable collapse-expand tree control for traversing one or more applications, each of the applications comprises one or more objects, the objects displayed in the hierarchy being grouped according to one or more obiect types selected from a group comprising Tables, Forms, Worksheets, Crosstabs, Mailing Labels, Form Letters, Reports, Charts, Envelopes, Named Finds & Sorts, and Macros; and program code configured to display in the application window one of the application, element or object selected in the navigator window.

10. The computer program product of claim 9, further comprising:

program code configured to modify a display characteristic of the Navigator window, the display characteristic selected from a group comprising maximizing the Navigator window, minimizing the Navigator window, resizing the Navigator window, closing the Navigator window, opening the Navigator window, repositioning the Navigator window, and combinations thereof.

11. The computer program product of claim 9, wherein various levels of the hierarchy may be displayed or hidden as desired, thereby allowing a user to easily view the contents of all open or selected applications or objects and to navigate quickly to any application or object presented on the tree control.

12. The computer program product of claim 9, wherein the object types are identified by a label and further comprising:

program code configured to enable selection of an icon next to the label to navigate to a next level of the tree control.

* * * * *